United States Patent
Ofek et al.

(10) Patent No.: US 8,184,911 B2
(45) Date of Patent: *May 22, 2012

(54) FLEXIBLE MATCHING WITH COMBINATIONAL SIMILARITY

(75) Inventors: Eyal Ofek, Redmond, WA (US); Yanatan Wexler, Redmond, WA (US); Pragyana Mishra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/092,416

(22) Filed: Apr. 22, 2011

(65) Prior Publication Data

US 2011/0200252 A1    Aug. 18, 2011

Related U.S. Application Data

(63) Continuation of application No. 11/743,352, filed on May 2, 2007, now Pat. No. 7,957,596.

(51) Int. Cl.
G06K 9/00 (2006.01)
G06K 9/46 (2006.01)
G06K 9/54 (2006.01)

(52) U.S. Cl. ........ 382/209; 382/168; 382/190; 382/305; 707/999.003; 707/999.006

(58) Field of Classification Search .................. 382/209, 382/164, 171, 173, 190, 219, 305, 154, 214, 382/218, 220, 227, 278, 270, 180, 304, 168.19; 715/835; 435/7.93; 436/501, 518; 359/561; 707/E17.058, E17.005, 999.006, E17.023, E17.024, E17.025, E17.021, 999.003

See application file for complete search history.

(56) References Cited

U.S. PATENT DOCUMENTS

| | | | |
|---|---|---|---|
| 7,287,018 B2 * | 10/2007 | Lennon | 707/694 |
| 7,415,153 B2 * | 8/2008 | Mojsilovic | 382/162 |
| 7,474,759 B2 * | 1/2009 | Sternberg et al. | 382/100 |
| 7,548,936 B2 * | 6/2009 | Liu et al. | 1/1 |
| 7,551,780 B2 * | 6/2009 | Nudd et al. | 382/190 |
| 7,639,387 B2 * | 12/2009 | Hull et al. | 358/1.18 |
| 7,957,596 B2 * | 6/2011 | Ofek et al. | 382/209 |
| 2006/0136402 A1 * | 6/2006 | Lee | 707/3 |

* cited by examiner

*Primary Examiner* — Sheela Chawan
(74) *Attorney, Agent, or Firm* — Shook Hardy & Bacon LLP

(57) ABSTRACT

Computer-readable media, systems, and methods for flexible matching with combinational similarity are described. In embodiments, an object image is received, a query image is received, and the query image is compared with the object image. In various embodiments matching information is determined based upon combinational similarity and the matching information is presented to a user. In various embodiments, comparing the query image with the object image includes dividing the object image into agents, creating a gradient histogram for the agents, determining map areas for the query image, creating a gradient histogram for the map areas, and creating a similarity array for each of the agents. Further, in various embodiments, determining matching information includes creating a combinational array by combining the similarity arrays for each agent and determining whether the combinational array includes a peak value.

20 Claims, 10 Drawing Sheets

FLEXIBLE MATCHING WITH COMBINATIONAL SIMILARITY

CROSS-REFERENCE TO RELATED APPLICATIONS

This application is a continuation of U.S. patent application Ser. No. 11/743,352, filed May 2, 2007, now U.S. Pat. No. 7,957,596 B2 which is herein incorporated by reference in its entirety.

BACKGROUND

Efficient and reliable matching of image patches is of vital importance to a variety of applications. For example, recognition of a store, such as a popular coffee shop, in a photograph by matching its logo with a sign in a ground image would allow for enhanced capabilities in various applications, such as satellite imagery applications. Emerging techniques aim to use matching of image patches to determine if an object, such as a logo, exists within an image. Further, these emerging techniques attempt to locate the region of the image where the object exists.

Unfortunately, techniques typically used for matching are inefficient and unreliable, falling far short of the quality necessary to be useful in many applications. For instance, techniques that utilize the brightness difference between images (e.g. sum-of-squared-differences) are overly sensitive to background noise, variations in image appearances attributable to three-dimensional appearance, illumination changes, color inconsistencies, clutter, and occlusions. Further, by way of example, local image patch-based similarity measures are similarly inefficient and unreliable. These techniques fail too often because, although they are more consistent than other techniques in circumstances involving changes to illumination and color, minuteness and/or absence of certain edge gradients in local regions causes the local measures to indicate a false-negative. Many applications miss a vital opportunity to advance functionality because of the inefficiency and unreliability of traditional image patch matching techniques.

SUMMARY

Embodiments of the present invention relate to computer-readable media, systems, and methods for flexible matching with combinational similarity. In embodiments, an object image is received, a query image is received and the query image is compared with the object image. Additionally, in embodiments, matching information is determined based upon the combinational similarity between the object image and the query image and the matching information is presented to a user. In embodiments, comparing the query image with the object image includes dividing the object image into agents, creating a gradient histogram for the agents, determining map areas for the query image, creating a gradient histogram for the map areas, and creating a similarity array for each of the agents. Further, in embodiments, determining matching information includes creating a combinational array by combining the similarity arrays for each agent and determining whether the combinational array includes a peak value.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
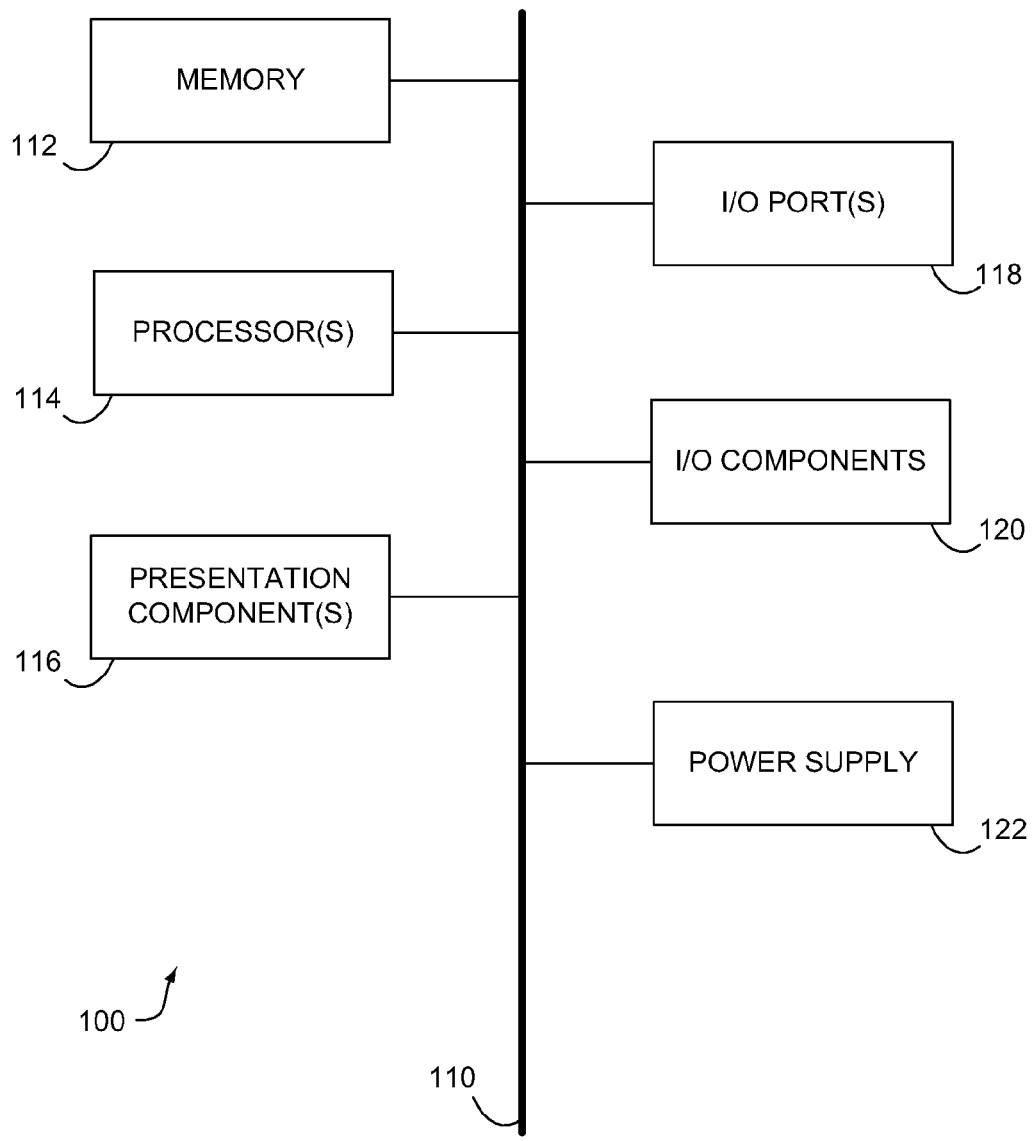
FIG. 1 is a block diagram of an exemplary computing system environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to computer-readable media, systems, and methods for flexible matching with combinational similarity. In various embodiments, an object image is received, a query image is received and the query image is compared with the object image. Additionally, in various embodiments, matching information is determined based upon the combinational similarity between the object image and the query image and the matching information is presented to a user. In various embodiments, comparing the query image with the object image includes dividing the object image into agents, creating a gradient histogram for the agents, determining map areas for the query image, creating a gradient histogram for the map areas, and creating a similarity array for each of the agents. Further, in various embodiments, determining matching information includes creating a combinational array by combining the similarity arrays for each agent and determining whether the combinational array includes a peak value. While embodiments discussed herein refer to communications between system components on a private network, it will be understood by one of ordinary skill in the art that embodiments are not limited to a private network or any particular network type. For example, other embodiments may communicate between components via the Internet.

Accordingly, in one aspect, the present invention is directed to a computer-implemented method for flexible matching with combinational similarity. The method includes receiving an object image and receiving a query image including one or more pixels. The method further includes comparing the query image with the object image and determining one or more matching information based upon combinational similarity. Further, the method includes presenting the one or more matching information to a user.

In another aspect, the present invention is directed to a computerized system for flexible matching with combinational similarity. The system includes a receiving component configured to receive an object image and a query image, a dividing component configured to divide the image into one or more agents, a map area component configured to determine one or more map areas, each map area corresponding to a pixel of the query image, a histogram component configured to create a gradient histogram for the one or more agents and a gradient histogram for the one or more map areas, a comparing component configured to compare the query image with the object image, and a determining component configured to determine one or more matching information based upon combinational similarity. The system further includes a database for storing information associated with the object image and the query image.

In yet another embodiment, the present invention is directed to one or more computer readable media having instructions embodied thereon that, when executed, perform a method for flexible matching with combinational similarity. The method includes receiving one or more object images and one or more query images. The method further includes processing the one or more object images and the one or more query images using combinational similarity, wherein processing the one or more object images and the one or more query images using combinational similarity includes combining one or more similarity arrays created by comparing one or more gradient histogram information associated with the one or more object images to one or more gradient histogram information associated with the one or more query images.

Having briefly described an overview of embodiments of the present invention, and exemplary operating environment is described below.

Referring to the drawing figures in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the present invention may be described in the general context of computer code or machine-usable instructions, including computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network. In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

Computing device 100 includes a bus 110 that directly or indirectly couples the following elements: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid state memory, hard drives, optical disc drives, and the like. Computing device 100 includes one or more processors that read from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
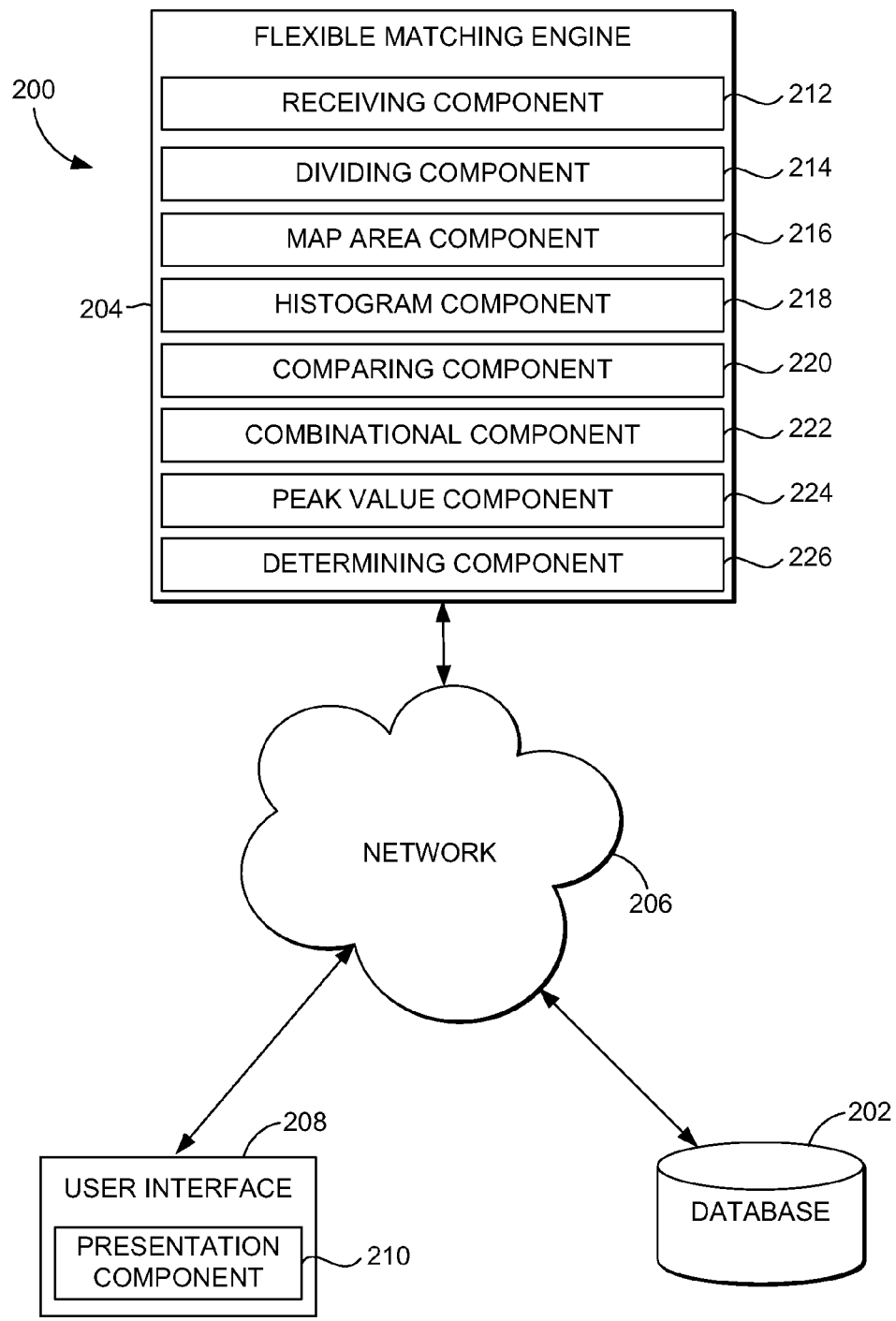
FIG. 2 is a block diagram illustrating an exemplary system for flexible matching with combinational similarity, in accordance with an embodiment of the present invention.

Turning now to FIG. 2, a block diagram is provided illustrating an exemplary system 200 for flexible matching with combinational similarity. The system 200 includes a database 202, a flexible matching engine 204, and a user interface 208 in communication with one another via network 206. Network 206 may include, without limitation, one or more local area networks (LANs) and/or wide area networks (WANs). Such networking environments are commonplace in offices, enterprise-wide computer networks, intranets, and the Internet. Accordingly, network 206 is not further described herein.

Database 202 is configured to store information associated with the object image and the query image in a flexible matching with combinational similarity environment. In various embodiments, such information may include, without limitation, object images, query images, grayscale values associated with object images and/or query images, red-green-blue (RGB) values associated with object images and/or query images, histogram information associated with object images and/or query images, similarity information and/or similarity arrays, combinational information and/or combinational arrays, and any combination thereof. Further, database 202 is configured to store information to be presented to a user in a flexible matching with combinational similarity environment. In various embodiments, such information may include, without limitation, information regarding whether an object image exists within a query image, information regarding the location of an object image within a query image, information regarding tracking of an object in video data, and any combination thereof, along with various other information for use in a flexible matching with combinational similarity environment. In various embodiments, database 202 is configured to be searchable so that various information may be retrieved by flexible matching engine 204. It will be understood and appreciated by those of ordinary skill in the art that the information stored in database 202 may be configurable and may include various information relevant to flexible matching with combinational similarity. The content and/or volume of such information are not intended to limit the scope of embodiments of the present invention in any way. Further, though illustrated as a single, independent component, database 202 may, in fact, be a plurality of databases, for instance, a database cluster, portions of which may reside on a computing device associated with flexible matching engine 204, associated with user interface 208, on another external computing device (not shown), or any combination thereof.

User interface 208 may be a type of computing device, such as computing device 100 described with reference to FIG. 1, for example, and includes at least one presentation component 210. Presentation component 210 is configured to present (e.g. display) matching information based upon combinational similarity. For example, without limitation, the matching information may indicate that an object image does or does not exist within a query image.

Flexible matching engine 204 may reside on a computing device, such as computing device 100 described with reference to FIG. 1. Flexible matching engine 204 includes a receiving component 212, a dividing component 214, a map area component 216, a histogram component 218, a comparing component 220, a combinational component 222, a peak value component 224, and a determining component 226. Further, flexible matching engine 204 is configured to operate utilizing at least a portion of the information stored in database 202.

Figure 9A:
FIG. 9A is an exemplary object image depicting a text logo with agents superimposed as squares over the text logo, in accordance with an embodiment of the present invention.
Figure 9B:
FIG. 9B is an exemplary query image depicting a ground image including an instance of a corresponding exemplary object image, in accordance with an embodiment of the present invention.

Receiving component 212 is configured to receive an object image and a query image from the flexible matching with combinational similarity environment. In various embodiments, by way of example, the object image and the query image are electronic images with one or more pixels as seen in FIGS. 9A and 9B. Embodiments of the present invention are not limited to any particular electronic image type and, by way of example, without limitation, may include .jpeg, .bmp, .gif, among other image file formats. In various embodiments, the object image may be any type of image including an object to search for in the query image. By way of example, without limitation, an object image may be a logo, such as the name of a store or restaurant. The logo may include text, may be entirely text, or may have no text. For example, without limitation, the logo could also be a symbol associated with a sports team. In various other embodiments, the object image may be a picture of a person's face, or a map, or any other type of image including an object to search for in the query image. Similarly, the query image may be any type of image. By way of example, without limitation, the query image may be a photograph taken from the street of a business district. By way of further example, without limitation, the query image may be a satellite image of a geographic location. Still further, without limitation, the query image may be an image stored in association with an image search index.

Dividing component 214 is configured to divide the object image into one or more agents. In various embodiments, by way of example, the object image will be divided into a number of agents so as to sufficiently divide major features of the object image. Thus, in various embodiments, agents are a portion of the object image. For example, without limitation, in various embodiments agents are a size and shape tailored to encompass the features of interest in an object image. For instance, where the object image is a text logo, the features of interest are the shapes of the letters. In various embodiments, the agent may be sized so that each letter is covered by a plurality of agents. By way of example, without limitation, for purposes of image matching, where the text logo includes the letter 's', the letter may be broken into a number of agents so that the curves of the letter 's' are each captured by an agent. Where the agent is too large and sized to capture the entire letter 's', some of the feature recognition will be lost when flexible matching engine 204 matches the object image to the query image. One of ordinary skill in the art will understand and appreciate that agent sizes are variable and that various agent sizes are appropriate depending upon the size and type of object image. Further, one of ordinary skill in the art will understand and appreciate that where agents are too large, capturing too many features, flexible matching engine 204 may have difficulty distinguishing the features and recognizing the features within the query image. Conversely, where agents are too small, the features structure will be very simplistic, creating a likelihood that flexible matching engine 204 will recognize a number of false-positives within the query image. Therefore, as will be understood and appreciated by one of ordinary skill in the art, agents of appropriate size and shape tailored to capturing the features of interest in an object image will allow for better matching because the agents will be small enough to match many of the features of interest in the object image to the query image. Further, agents of appropriate size and shape tailored to capturing features of interest in an object image will allow for better matching because the agents will be large enough that the features of interest in the object image are not rendered meaningless by matching features of interest in the object image to false-positives in the query image.

Map area component 216 is configured to determine one or more query image map areas, each map area corresponding to a pixel of the query image. In various embodiments, by way of example, the map area will consist of an 11×11 pixel area surrounding a pixel. Stated differently, the map area associated with a pixel will be an area extending five pixels right, left, up, and down from the pixel, creating an 11×11 pixel area. Each pixel in the query image will be associated with a map area by map area component 216. Thus, as will be understood and appreciated by one of ordinary skill in the art, the map areas for various pixels in the query image will overlap one another. Embodiments of the present invention are in no way limited to any particular map area configuration. For example, without limitation, the map area may be a single pixel, a 3×3 pixel map area, a 5×5 pixel map area, etc. Further, embodiments of the present invention are not limited to square map areas. For example, without limitation, the map area may be rectangular in shape. Various map area configurations may be appropriate based upon the size and pixel density of the query image.

Figure 6:
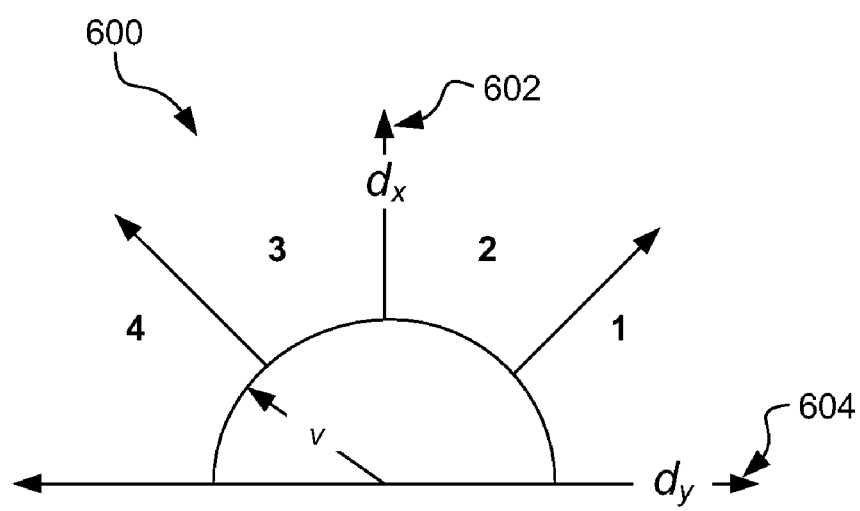
FIG. 6 is a graphical view of a histogram for use in flexible matching with combinational similarity, in accordance with an embodiment of the present invention.
Figure 7:
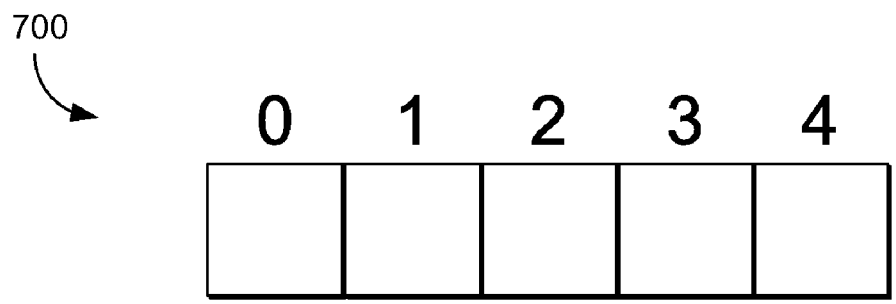
FIG. 7 is an array view of a histogram for a grayscale image for use in flexible matching with combinational similarity, in accordance with an embodiment of the present invention.
Figure 8:
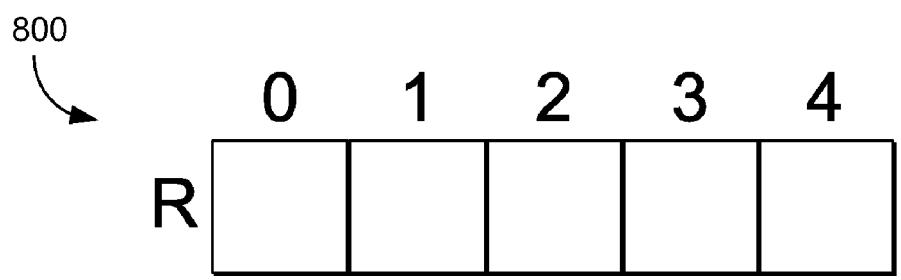
FIG. 8 is an array view of a histogram for a color image for use in flexible matching with combinational similarity, in accordance with an embodiment of the present invention.
Figure 8:
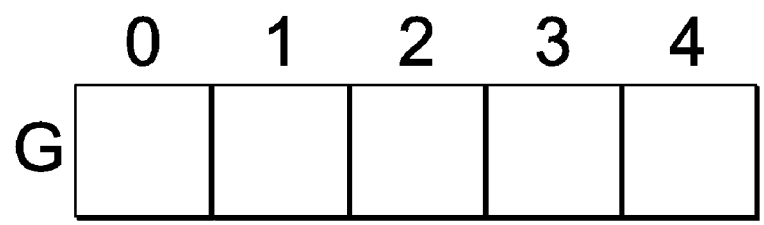
Figure 8:
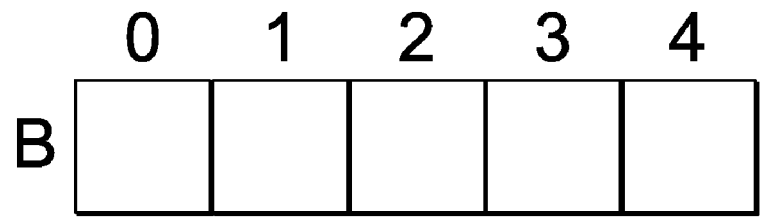

Histogram component 218 is configured to create a gradient histogram for one or more agents and a gradient histogram for one or more map areas. The gradient histogram, as seen in FIGS. 6-8, is created for each agent and map area based upon the gradient direction at each pixel in relation to both the horizontal and vertical axes. Thus, as will be understood and appreciated by one of ordinary skill in the art, each pixel will contain an orientation $\theta=\tan^{-1}(d_x/d_y)$ ($0 \leq \theta < \pi$) and a magnitude $\mu=\|(d_x, d_y)\|_2$. Upon determining an orientation and a magnitude for an agent or map area, histogram component 218 will create a histogram by "binning" according to the binning rule:

$$bin(\theta, \mu) = \begin{cases} 1 + \lfloor \theta/\pi \cdot B \rfloor & \text{If } \mu > v \\ 0 & \text{Otherwise} \end{cases}$$

where B+1 is the number of bins and the constant v is chosen based upon the camera noise value. A graphical view of an exemplary histogram for use in flexible matching with combinational similarity, in accordance with an embodiment of the present invention, is depicted and will be discussed in more detail with reference to FIG. 6.

The histogram created by histogram component 218 is matrix, or array, of values. For instance, in various embodiments, without limitation, there will be five total bins (bin 0-bin 4). Bins 1-4 represent various orientations of $d_x$ and $d_y$ and bin 0 represents a $d_x$ and $d_y$ value less than v. Thus, for a grayscale image, the array includes five elements (one element corresponding with each bin). The values of each array element will be incremented according to the gradient orientation in the agent or map area. For example, without limitation, an exemplary grayscale pixel histogram, as created by histogram component 218 may include a 1×5 matrix corresponding with the five bins and the matrix values may be [0][0][0][1][0] where the orientation of $d_x$ and $d_y$ falls within bin 3. In various embodiments of the present invention, the gradient orientation of the pixel may be such that more than one bin includes a value. One of ordinary skill in the art will understand and appreciate that histogram configurations are not limited to a five-bin configuration. For example, without limitation, various embodiments of the present invention may include any number of bins and corresponding array elements.

Exemplary pixel histograms for color images will differ slightly from grayscale histograms. In color images, each pixel is associated with three values (a red value R, a green value G, and a blue value B). In various embodiments, a color histogram may include a 3×5 matrix wherein each of the three rows corresponds with an RGB value and each of the five columns corresponds with a histogram bin. For example, without limitation, a color pixel histogram may appear as:

[0][0][0][1][0]
[0][0][0][1][0]
[0][0][0][1][0]

where the orientation of $d_x$ and $d_y$ falls within bin 3 for the R pixel value, the G pixel value, and the B pixel value. Again, embodiments of the present invention are not limited to any particular histogram or array configuration and various embodiments of the present invention may include any number of bins and corresponding array elements. Histogram component 218 creates a histogram for each agent and each pixel in a query image (using a map area for each pixel as discussed above with reference to map area component 216).

Comparing component 220 is configured to compare the query image with the object image. For example, without limitation, for each agent in the object image, comparing component 220 will compare the agent's histogram with the histogram of each pixel in the query image to determine similarity at each pixel. In various embodiments, where h(a) is the histogram for the agent in an object image and h(p) is the histogram for the map area around pixel p in a query image, the similarity between the agent and the pixel is defined as:

$$S(a,p) = h(a)^\perp h(p)$$

In various embodiments, without limitation, this is a value in the range between 0 and 1, where higher values denote higher similarity. In various embodiments, without limitation, the similarity function is a dot product, but embodiments of the present invention include any similarity function for comparing h(a) and h(p).

Comparing component 220, in various embodiments, may be configured to compare an agent with each pixel in a query image. For example, without limitation, given a set of agents $A=\{r_1, \ldots, r_k\}$ and a query image I for each p∈I comparing component 220 computes a similarity at each location using the above similarity equation ($S(a,p)=h(a)^\perp h(p)$) to provide a match likelihood for each element of a similarity array, over all locations in the query image, the element of the similarity array defined in various embodiments as:

$$L_i(p) = \frac{h(p)^T h(r_i)}{\sum_p h(p)^T h(r_i)}$$

$$\forall\, p \in I$$

In various embodiments, similarity array element $L_i$ alone may not be very informative because it may have few distinguished peaks. But, in these embodiments, as long as similarity array L, is not uniform and as long as it is accurate, similarity array $L_i$ will be a useful set of information for flexible matching engine 204. Comparing agent 220 may, in various embodiments, continue the process of creating similarity arrays for each agent in the given set of agents A={$r_1$, . . . , $r_k$}, creating a total number of similarity arrays equal to the total number of agents in the object image, each similarity array being a comparison between one of the agents and every pixel in the query image, and each agent having a distinct similarity array.

Combinational component 222 is configured to combine the similarity array for each of the agents. For instance, without limitation, the similarity array may be a two-dimensional array wherein each element of the array corresponds with a pixel in the query image. The value in each element of the two-dimensional similarity array may be, in various embodiments, the likelihood that the agent corresponding to a similarity array exists within the map area of the pixel corresponding to the element of the similarity array. In various embodiments, without limitation, the likelihood value of the similarity array may be a value between 0 and 1 wherein higher values denote higher likelihood that the agent exists within the map area of the corresponding pixel. Thus, in various embodiments, combinational component 222 sums the values of each agent's corresponding similarity array, creating another, summed, two-dimensional array. Like the similarity array, the combinational array may be a two-dimensional array wherein each element of the array corresponds with a pixel in the query image. The value in each element, however, may be greater than 1 because the value is a sum of the similarity array elements for each agent corresponding to a particular pixel. Thus, the value in each element of the combinational array will be between 0 and A, wherein A is the total number of agents in the object image.

Peak value component 224 is configured to determine whether an instance of the object image exists in the query image. In various embodiments, without limitation, peak value component 224 looks for a peak in the combinational array, as seen in FIGS. 10-13. For example, the joint likelihood of finding the object image at location p is:

$$P(\text{object}) = \prod_i P(\text{part}_i) \sim \sum_i T_i(L_i)$$

where $\text{part}_i$ corresponds with the ith agent and where $T_i$ is the spatial translation of the ith agent with respect to an arbitrary origin. In this example, the joint likelihood function is translation independent and can be efficiently computed for all locations in the query image. Further, in various embodiments, the peak value component 224 measures the probability that each agent is at its corresponding position in a query image and, thus, the response of each part contributes to the joint likelihood function. One of ordinary skill in the art will understand and appreciate that a single part strongly contributing to the likelihood of one location could be counterbalanced by several other parts with weaker responses that agree on some other location. In various embodiments, the sum-product technique of peak value component 224 accounts for possible outliers or false positives attributable to background clutter or illumination variations. Once peak value component 224 has found a peak, the value of the peak denotes the total likelihood provided by the various agents. Lower values are the result of a combination of mismatches and, therefore, a threshold must be applied to determine whether the object image exists within the query image.

Determining component 226 is configured to determine matching information based upon combinational similarity. As discussed above with reference to peak value component 224, the peak value denotes the total likelihood provided by the various agents. In various embodiments, determining component 226 applies a threshold to the peak value to determine matching information. For example, without limitation, the matching information may include an indication as to whether an instance of the object image exists within the query image, based upon a defined threshold. For instance, if the peak value is greater than the threshold, then a match is likely to exist. Embodiments of the present invention are not limited to any particular threshold value. Various threshold values may be appropriate depending upon the size, pixel density and image type of the object image and, thus, various threshold values are contemplated and within the scope of the present invention. The matching information may also include information regarding the location of the object image instance within the query image. For example, without limitation the matching information might indicate a region in the query image where the object image is likely to be found.

It will be understood and appreciated by those of ordinary skill in the art that additional components not shown may also be included within any of system 200, database 202, flexible matching engine 204, and user interface 208.

Figure 3:
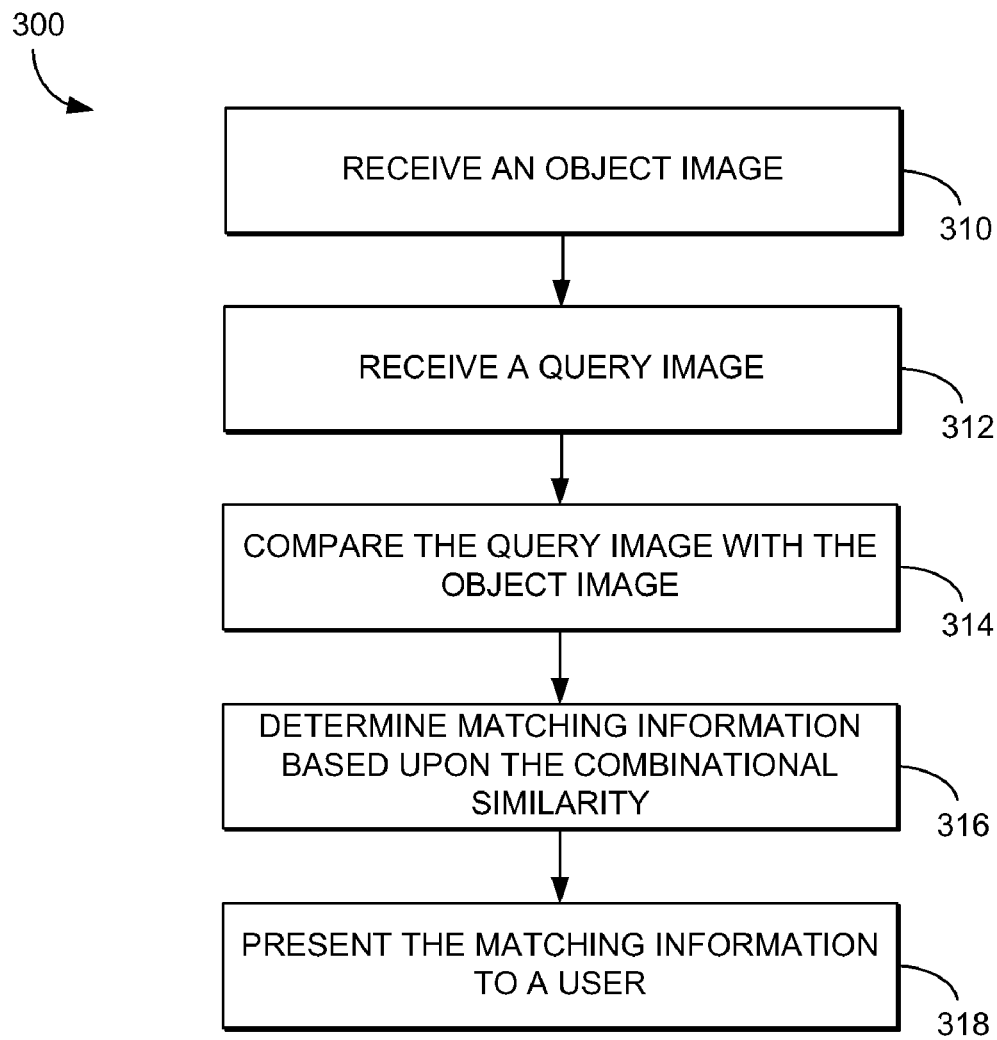
FIG. 3 is a flow diagram illustrating an exemplary method for flexible matching with combinational similarity, in accordance with an embodiment of the present invention.

Turning now to FIG. 3, a flow diagram of an exemplary method for flexible matching with combinational similarity, in accordance with an embodiment of the present invention, is illustrated and designated generally as reference numeral 300. Initially, as indicated at block 310, an object image is received, e.g., by receiving component 212 of FIG. 2. By way of example, without limitation, the object image may be a text logo or an image logo, such as an symbol associated with a sports team. An exemplary object image is shown in FIG. 9A. In various other embodiments, the image object may be a map including landmarks and/or roads. In yet other embodiments the image object may be a person's face or a sketch of an object. Any and all such variations, any combinations thereof, and various other types of object images are contemplated to be within the scope of embodiments of the present invention.

Next, as indicated at block 312, a query image is received, e.g., by receiving component 212 of FIG. 2. By way of example, without limitation, the query image may be a ground image of a house or a commercial district. An exemplary query image is shown in 9B. In various other embodiments, the query image may be a satellite image. In yet other embodiments, the query image may be a frame of a video feed. Any and all such variations, any combinations thereof, and various other types of query images are contemplated to be within the scope of embodiments of the present invention.

Next, as indicated at block 314, the query image is compared with the object image. In various embodiments of the present invention, comparing the query image with the object image includes dividing the object image into agents, as shown in FIG. 9A, and the query image into map areas and creating gradient histograms for each agent and map area, as previously discussed with reference to FIG. 2. Further, in various embodiments of the present invention, a similarity array is created for each agent comparing the agent to the map area for every pixel in the query image. The similarity array, in this example, will include a similarity value for each pixel in the query image indicating the similarity between each pixel's map area and the agent being compared. As previously discussed with reference to comparing component 220 of FIG. 2, in various embodiments, a similarity array is created for each agent of the object image.

Next, as indicated at block 316, matching information is determined based upon combining similarity arrays for each agent in the object image to create a combinational array. In these embodiments, where the combinational array includes a peak and where the peak value is sufficiently high to overcome a threshold value, the likelihood of an instance of the object image in the query image is high and the matching information will include an indication that the object image exists within the query image. In various other embodiments, the matching information may include an indication as to a location within the query image where the object image is likely to exist. For example, without limitation, the matching information may include a region of the query image, such as a rectangle, circle, or square, in which the object image is likely to exist. As another example, without limitation, the matching information may include the location of the top of the peak, indicating the location of the query image with the highest peak value where the object image is most likely to exist around. Where the peak value does not exceed the threshold, the matching information may include an indication that the object image does not exist within the query image.

Next, as indicated at block 318, the matching information is presented to a user, e.g., by presentation component 210 of FIG. 2. As previously described, various matching information can be presented in a number of formats in order to most appropriately convey the matching information to the user. For example, without limitation, the user may be presented with an indication that the object image exists within the query image, along with a location in the query image where the object image instance occurs. For instance, by highlighting the location in the query image where the object image occurs as shown in FIG. 9B.

Figure 4:
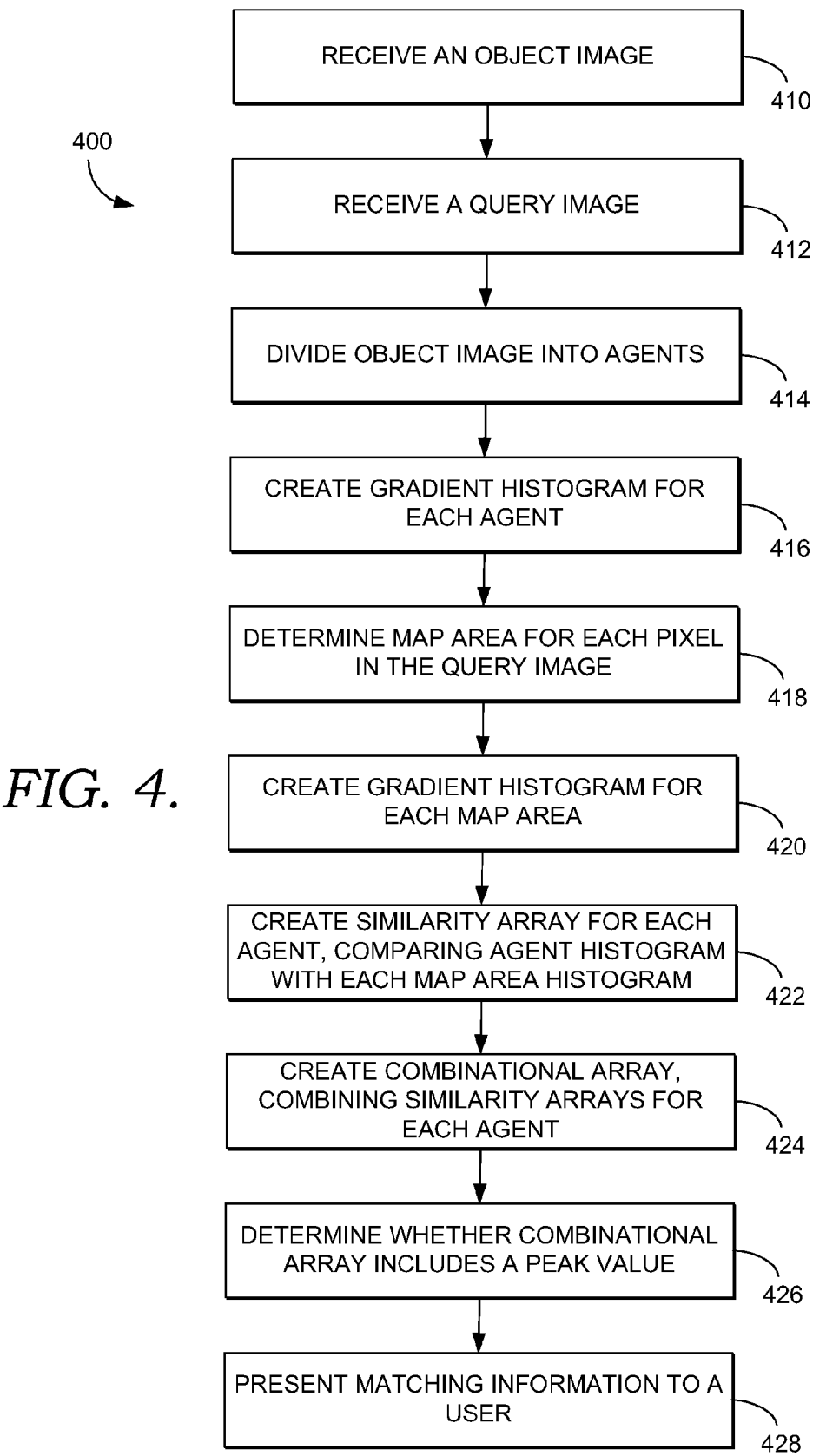
FIG. 4 is a flow diagram illustrating an exemplary method for flexible matching with combinational similarity, the method having more detail than the method of FIG. 3, in accordance with an embodiment of the present invention.

Turning now to FIG. 4, a flow diagram of an exemplary method for flexible matching with combinational similarity, the method having more detail than the method of FIG. 3, in accordance with an embodiment of the present invention, is illustrated and designated generally as reference numeral 400. Initially, as indicated at block 410, an object image is received, e.g., by receiving component 212 of FIG. 2 as previously discussed with reference to block 310 of FIG. 3. Next, at block 412, a query image is received, e.g., by receiving component 212 of FIG. 2 as previously discussed with reference to block 312 of FIG. 3.

Next, as indicated at block 414, the object image is divided into agents, e.g., by dividing component 214 of FIG. 2. In various embodiments, agents are regions of the object image including one or more pixels. Various agent sizes and shapes may be appropriate depending upon the size, resolution, and complexity of the object image. For example, without limitation, where the object image includes a text logo, the text logo may be divided into a 3×17 grid, creating a number of squares. As another example, without limitation, where the object image includes a map, the map may be divided into a number of rectangular subparts, wherein each subpart is an agent of the object image. One of ordinary skill in the art will understand and appreciate that various agent configurations are contemplated and within the scope of the present invention.

Next, as indicated at block 416, a gradient histogram is created for each agent, e.g., by histogram component 218 of FIG. 2. In various embodiments, the gradient histogram is divided into a number of bins for classifying an agent based on its gradient orientation. For example, without limitation, where there are five bins, each gradient histogram will include a five element array, wherein each element corresponds with one of the bins. As previously discussed, the gradient histogram for a grayscale image and a color RGB image will be slightly different because a grayscale pixel only has one value associated with it and because a color pixel has three values associated with it (red, green, and blue) as shown in FIGS. 7 and 8. One of ordinary skill in the art will understand and appreciate that the present invention is not limited to any particular histogram configuration or bin total. For example, without limitation, a gradient histogram may have 3 bins, 4 bins, 5 bins, etc., depending upon how precise of a gradient orientation measurement is necessary.

Next, as indicated at block 418, a map area for each pixel in the query image is determined, e.g., by map area component 216 of FIG. 2. For example, a map area for each pixel of the exemplary query image shown in FIG. 9B is determined. In various embodiments, the map area is a number of pixels surrounding a pixel. For instance, given a pixel p, a map area may be an 11×11 square of pixels surrounding pixel p. Thus, because a map area is created for each pixel in the query image, map areas will overlap on the query image. One of ordinary skill in the art will understand and appreciate that the present invention is not limited to any particular map area configuration and map area sizes and shapes may vary depending upon the size, resolution, and complexity of the query image. For example, without limitation, where a query image has minimal complexity, it may be appropriate and effective to use larger map areas.

Next, as indicated at block 420, a gradient histogram for each map area is created, e.g., by histogram component 218 of FIG. 2. Similar to block 416, in various embodiments, the gradient histogram for each map area may be divided into a number of bins for classifying a map area based upon its gradient orientation such as a gradient histogram shown in FIGS. 7 and 8. In these embodiments, the gradient histogram will include an array with a number of elements, wherein each element corresponds with a bin. Again, one of ordinary skill in the art will understand and appreciate that the present invention is not limited to any particular histogram configuration or bin total.

Next, as indicated at block 422, a similarity array is created for each agent by comparing the agent histogram with each map area histogram, e.g., by comparing component 220 of FIG. 2. In various embodiments, each agent in the object image is associated with a similarity array. In these embodiments, the similarity array is a two-dimensional array including a number of elements equal to the number of pixels in the query image. Thus, each element in the similarity array corresponds with a pixel in the query image. In various embodiments, the value of each element of the similarity array is a likelihood value based upon a comparison of the agent's histogram to the map area histogram of each corresponding pixel. In various embodiments, an individual similarity array is created for each agent, comparing that agent to each pixel in the query image. One of ordinary skill in the art will understand and appreciate that the values of the elements of the similarity array may be various values indicating a higher or lower likelihood that the agent exists within the map area of a corresponding pixel. For instance, without limitation, the similarity array elements may be between 0 and 1, wherein a higher value denotes a higher likelihood that the agent exists within the map area of a corresponding pixel.

Next, as indicated at block 424, a combinational array is created by combining similarity arrays for each agent, e.g., by combinational component 222 of FIG. 2. In various embodiments, the combinational array is a two-dimensional array including a number of elements equal to the number of pixels in the query image. Thus, the combinational array may have the same configuration as the similarity arrays discussed with reference to block 422 above. In various embodiments, the value of an element of a combinational array is a sum of the values of each of the corresponding similarity array elements. By way of example, without limitation, where there are 51 agents (assuming a object image divided into a 3×17 grid) and where the values in each of the corresponding 51 similarity arrays are between 0 and 1, the highest possible value for an element in the combinational array would be 51, where a map area of a pixel has a likelihood value of 1 for each agent. This exemplary scenario is meant for illustrative purposes but is unlikely in implementation of the present invention because typically the exemplary 51 agents will have different gradient orientations and different histograms and, thus, a comparison of a pixel's map area to the agents is unlikely to return the highest possible likelihood value for each agent. Again, one of ordinary skill in the art will understand and appreciate that the present invention is in no way limited to any number or configuration of agents, nor is the present invention limited to any particular element values for the similarity array and the combinational array. Rather, the above discussion is meant for illustrative purposes only.

Next, at block 426 it is determined whether the combinational array includes a peak value, e.g., using peak value component 224 and determining component 226 of FIG. 2. In various embodiments, a threshold is applied to the combinational array and if a peak value exists that is higher than the threshold, it is an indication that the object image is likely to exist at that location in the query image. Conversely, in various embodiments, if there is no peak value at all, or if the peak value is below the threshold, it is an indication that the object image is not likely to exist within the query image. Next, at block 428 matching information is presented to a user, e.g., by presentation component 210 of FIG. 2 as previously discussed with reference to block 318 of FIG. 3.

Figure 5:
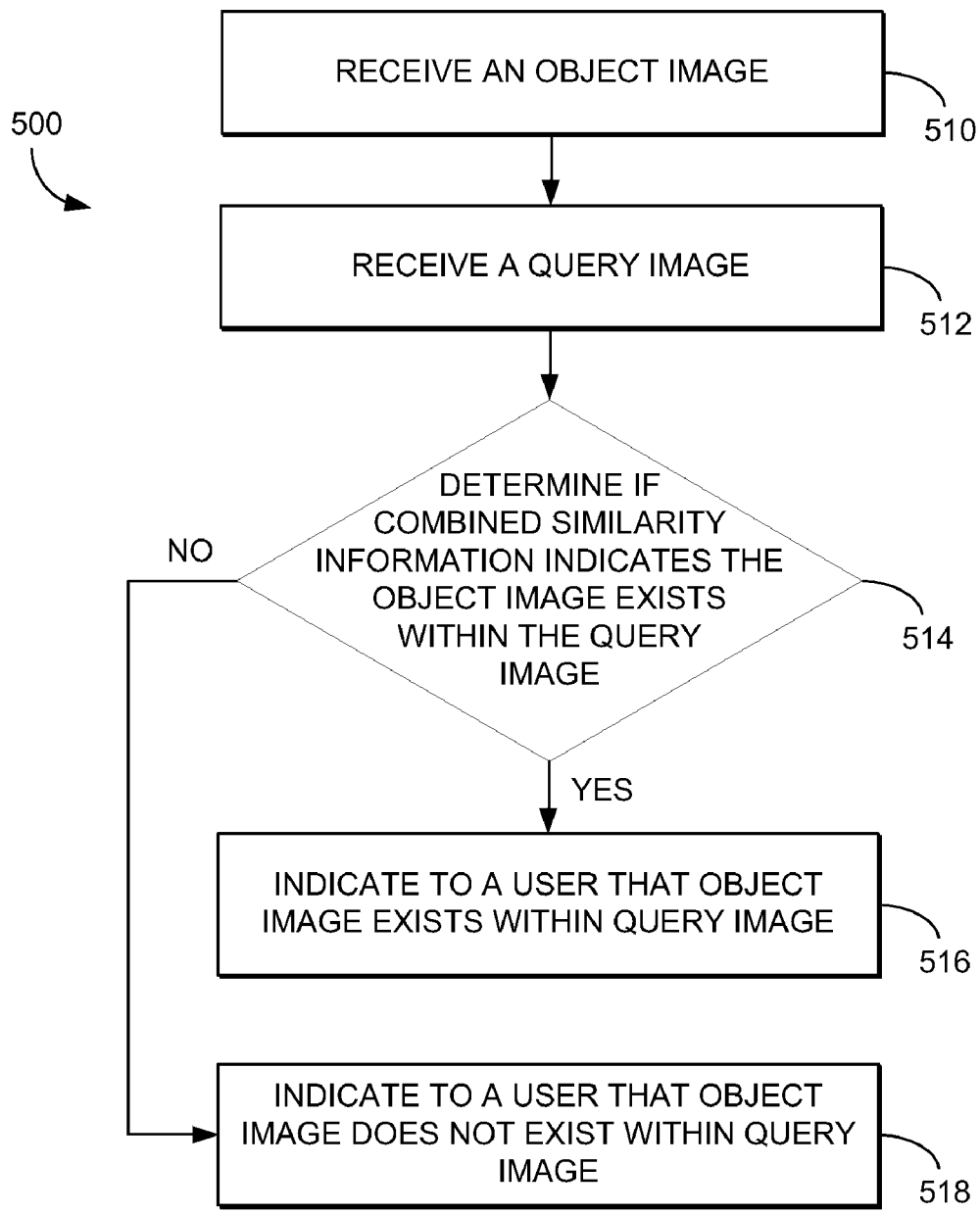
FIG. 5 is a flow diagram illustrating an exemplary method for flexible matching with combinational similarity, utilizing a user indication regarding whether an object image exists in a query image, in accordance with an embodiment of the present invention.

Turning now to FIG. 5, a flow diagram of an exemplary method for flexible matching with combinational similarity, utilizing a user indication regarding whether an object image exists in a query image, in accordance with the present invention, is illustrated and designated generally as reference numeral 500. Initially, as indicated at block 510, an object image is received, e.g., by receiving component 212 of FIG. 2 as previously discussed with reference to block 310 of FIG. 3. Next, at block 512, a query image is received, e.g. by receiving component 212 of FIG. 2 as previously discussed with reference to block 312 of FIG. 3.

Next, as indicated at block 514, it is determined if combined similarity information indicates the object image exists within the query image. If it is determined that the combined similarity indicates that the object image does exist within the query image, the method indicates to a user that the object image exists within the query image, as indicated at block 516. If, however, it is determined that the combined similarity does not indicate the object image exists within the query image, the method indicates to a user that the object image does not exist within the query image, as indicated at block 518.

Referring now to FIGS. 6-13, one of ordinary skill in the art will understand and appreciate how, in various embodiments, the steps and components of the present invention interact to match an object image with a query image. The exemplary figures included in FIGS. 6-13 are meant as illustrative figures to further elucidate various embodiments of the present invention and are in no way meant to limit the scope of the present invention to any particular exemplary embodiment. The object image shown in FIG. 9A is received and divided into a number of agents. The query image shown in FIG. 9B is also received and a map area is determined for each pixel in the query image. A histogram, such as the exemplary graphical histogram illustrated in FIG. 6, is used to categorize each agent and map area into one or more bins and the bin values are incremented in the array view of the histogram, as indicated in the exemplary array views depicted in FIGS. 7 and 8. The agent histograms of the object image shown in FIG. 9A and the map area histograms of the query image shown in FIG. 9B are compared, creating a similarity array associated with each agent. Once a similarity array has been created for each agent, the similarity arrays are combined to create a combinational array, as depicted in FIGS. 10-13. As can be appreciated with reference to FIGS. 10-13, when only a few of the similarity arrays have been summed, as in FIG. 10, the combinational array lacks any defined peaks and is of minimal value for matching purposes. The combinational array, however, as it continues to sum similarity arrays for each of the agents, begins to develop a more distinct peak, as in FIGS. 11 and 12. Finally, when all the similarity arrays have been summed, as in FIG. 13, a distinct peak emerges, indicating a match of the object image shown in FIG. 9A to a location in the query image shown in FIG. 9B. Further, the location of the peak indicates the location of the match in the query image. Thus, as illustrated in FIG. 9B, an indication, such as a highlighted box, may show the position of the object image. The present exemplary discussion of various embodiments is in no way intended to limit the scope of the present invention to the use of any particular steps or any particular components. Rather, this discussion is intended for illustrative purposes so one of ordinary skill in the art may fully appreciate various embodiments of the present invention. Having provided a general illustrative overview, each of FIGS. 6-13 will be described in more detail herein.

With reference to FIG. 6, a graphical view of a histogram for use in flexible matching with combinational similarity, in accordance with an embodiment of the present invention, is illustrated and designated generally as reference numeral 600. Graphical histogram 600 includes a $d_x$ axis 602 and a $d_y$ axis 604. As can be appreciated with reference to FIG. 6, graphical histogram 600 is divided into five regions, or bins, labeled 0 to 4. Thus, in various embodiments of the present invention, depending upon the gradient orientation (characterized by $d_x$ and $d_y$) of an agent or a map area, the agent or map area will be "binned" into one of the bins 0 to 4 of the graphical histogram. As can be appreciated with reference to FIG. 6, bin 0 is the category for all agents or map areas with a $d_x$ and $d_y$ less than constant v. As previously discussed, constant v is a value selected with respect to a camera's noise value. For instance, without limitation, where a camera includes a lot of noise information in images, the constant v may be higher to account for the camera's noise value. Thus, in various embodiments, implementing a graphical histogram with bin 0 defined by a constant v, allows the flexible matching engine 204 of FIG. 2 to overcome false positives and to account for flat areas. For example, where an agent of an object image has a flat area and it is compared to a map area for a pixel in a query image with a flat area, both will be "binned" at bin 0, indicating a high likelihood that the flat area of the agent exists in the map area. One of ordinary skill in the art will understand and appreciate that graphical histogram 600 is provided for illustrative purposes only and in no way limits the present invention to any particular graphical histogram configuration. As previously discussed, histograms may have more bins, less bins, different values for the v constant, or no v constant at all depending upon the characteristics of the object image and query image being compared. Any and all such variations, and any combinations thereof, are contemplated to be within the scope of embodiments of the present invention.

With reference to FIG. 7, an array view of a histogram for a grayscale image for use in flexible matching with combinational similarity, in accordance with an embodiment of the present invention, is illustrated and designated generally as reference numeral 700. In various embodiments, the array view of the histogram will have the same number of elements as there are bins in the graphical view of the histogram, each element corresponding with a bin. Thus, as illustrated in FIG. 7, for a grayscale image, the array view of the histogram includes a 1×5 matrix, labeled with 0 to 4. In various embodiments of the present invention, each agent of an object image and each map area corresponding with a pixel of a query image are associated with a histogram. For example, without limitation, based upon the gradient orientation of the agent or map area, certain elements are populated with values (e.g. the array element 0 would include a value where an agent or map area is substantially flat (as determined by the value constant v)). In various embodiments of the present invention, more than one element of the histogram array may be populated where more than one "binned" gradient orientation is present within a particular agent or map area. One of ordinary skill in the art will understand and appreciate that the present invention is not limited to any particular array histogram configuration and may have as many elements as necessary to correspond with the number of bins in the graphical histogram.

With reference to FIG. 8, an array view of a histogram for a color image for use in flexible matching with combinational similarity, in accordance with an embodiment of the present invention, is illustrated and designated generally as reference numeral 800. In various embodiments, color images have three values (red, green, and blue), therefore, for color images, there are three histogram arrays, each associated with one color value. As previously discussed with reference to FIG. 7, in various embodiments, the three array histograms may be populated with values based upon the gradient orientation of an agent or map area. In various embodiments, the histogram array for a color image may be a single two-dimensional array, instead of three separate one-dimensional arrays. Again, one of ordinary skill in the art will understand and appreciate that the present invention is not limited to any particular array histogram configuration and may have as many elements as necessary to correspond with the number of bins in the graphical histogram.

With reference to FIG. 9A, an exemplary object image depicting a text logo with agents superimposed as squares over the text logo, in accordance with an embodiment of the present invention, is illustrated and designated generally as reference numeral 900. Object image 900 includes one or more agents 902. As previously discussed with reference to dividing component 214 of FIG. 2, an object image is divided into one or more agents. FIG. 9 is provided to illustrate the application of agents to a text logo. In various embodiments, agents 902 may be any shape and/or size, and there may be any number of agents associated with a particular object image. Further, as previously discussed, object image 900 is not limited to a particular type of object image. For example, without limitation, object image 900 may be an image logo, a map, a person's face, a sketch or various other types of images. Any and all such variations, and any combinations thereof, are contemplated to be within the scope of embodiments of the present invention.

With reference to FIG. 9B, an exemplary query image depicting a ground image including an instance of a corresponding exemplary object image, in accordance with an embodiment of the present invention, is illustrated. As can be appreciated with reference to the exemplary query image in FIG. 9B, an instance of the exemplary object image of 9A is included. The exemplary object image of 9A is highlighted with a box, illustrating an exemplary way in which flexible matching with combinational similarity may indicate to a user the location of an object image within a query image. As will be understood and appreciated by one of ordinary skill in the art, the highlighted box in the exemplary query image of FIG. 9B corresponds with the peak illustrated in FIG. 13.

Figure 10:
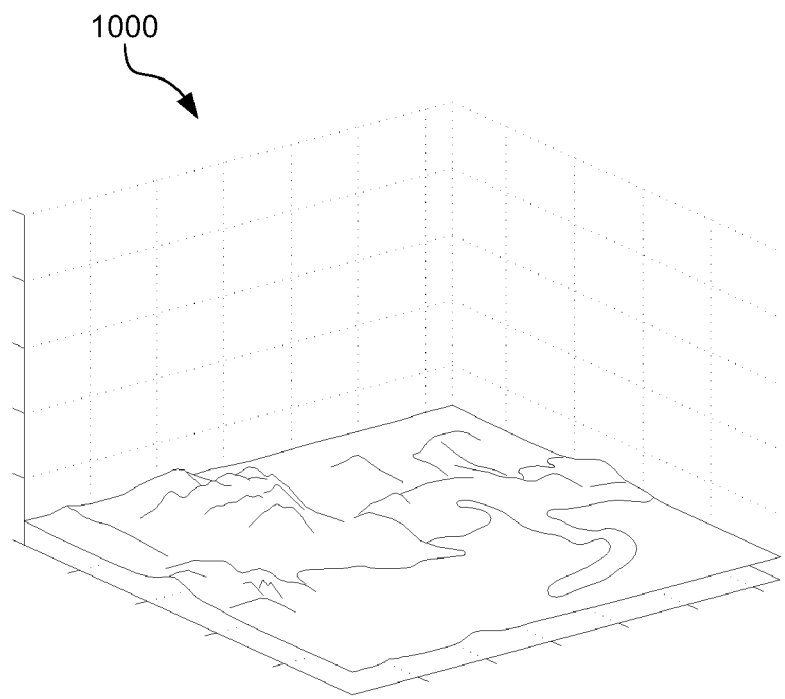
FIG. 10 is a perspective view of an exemplary combinational array for use in flexible matching with combinational similarity depicting a combination of 10 similarity arrays, in accordance with an embodiment of the present invention.

Referring now to FIGS. 10-13, perspective views are provided illustrating combinational arrays as more similarity arrays are summed, in accordance with various embodiments of the present invention. The perspective views of FIGS. 10-13 are for an object image divided, e.g., by dividing component 214 of FIG. 2, into a 3×17 grid, creating 51 agents with 51 corresponding similarity arrays. The present invention is not limited to any particular agent configuration and one of ordinary skill in the art will understand and appreciate that various sizes, shapes, and numbers of agents may be successfully used in the present invention. With reference to FIG. 10, a perspective view of an exemplary combinational array for use in flexible matching with combinational similarity depicting a combination of 10 similarity arrays, in accordance with an embodiment of the present invention, is illustrated and designated generally as reference numeral 1000. The two horizontal axis represent the two dimensions of the two-dimensional combinational array, which corresponds with the pixels in the query image. The vertical axis denotes the value in each element of the combinational array. As can be appreciated with reference to FIG. 10, in various embodiments of the present invention, the locations with higher vertical values indicate locations in the query image that are more likely to include the object image. In FIG. 10, where 10 of 51 similarity arrays have been summed, there are areas in the combinational array indicating a higher probability of an instance of the object image than other areas (e.g., hills and valleys). The combinational array, however, does not yet have any distinct peak indicating with confidence that an instance of the object image exists within the query image.

Figure 11:
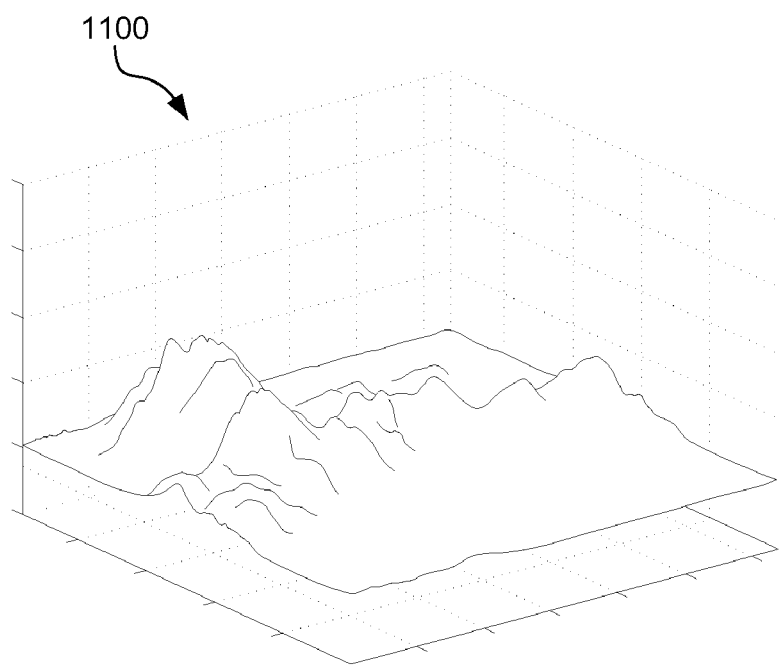
FIG. 11 is a perspective view of an exemplary combinational array for use in flexible matching with combinational similarity depicting a combination of 30 similarity arrays, in accordance with an embodiment of the present invention.
Figure 12:
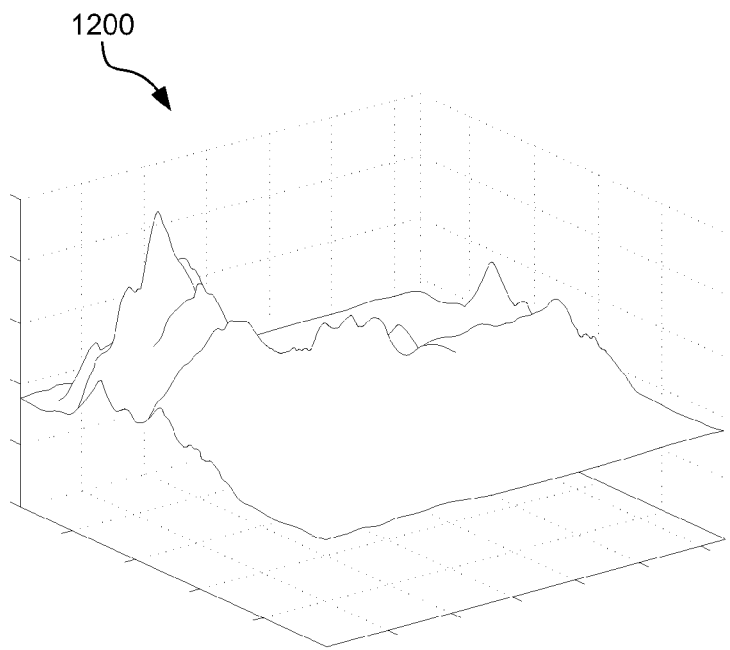
FIG. 12 is a perspective view of an exemplary combinational array for use in flexible matching with combinational similarity depicting a combination of 40 similarity arrays, in accordance with an embodiment of the present invention.

With reference to FIG. 11, a perspective view of an exemplary combinational array for use in flexible matching with combinational similarity depicting a combination of 30 similarity arrays, in accordance with an embodiment of the present invention, is illustrated and designated generally as reference numeral 1100. In FIG. 11, where 30 of 51 similarity arrays have been summed, relatively non-distinct hills and valleys still exist, as in FIG. 10, indicating a possibility, but not a high probability, of an object image at any particular location within the query image. In FIG. 11, however, a more distinct peak does begin to emerge that appears significantly higher than the surrounding hills. With reference to FIG. 12, a perspective view of an exemplary combinational array for use in flexible matching with combinational similarity depicting a combination of 40 similarity arrays, in accordance with an embodiment of the present invention, is illustrated and designated generally as reference numeral 1200. In FIG. 12, where 40 of 51 similarity arrays have been summed, a peak continues to define itself to the point where it becomes distinct from the surrounding hills and valleys, indicating a higher probability of the object image at that location in the query image.

Figure 13:
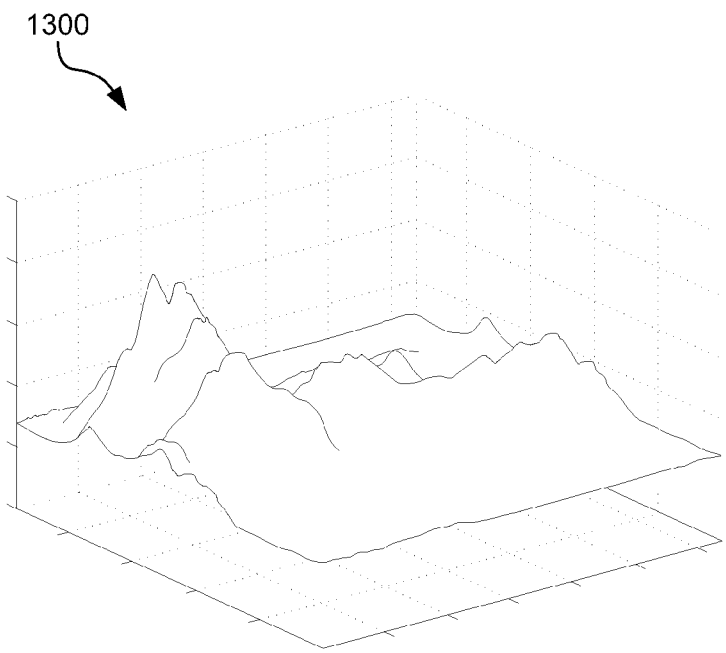
FIG. 13 is a perspective view of an exemplary combinational array for use in flexible matching with combinational similarity depicting a combination of 51 similarity arrays, in accordance with an embodiment of the present invention.

With reference to FIG. 13, a perspective view of an exemplary combinational array for use in flexible matching with combinational similarity depicting a combination of 51 similarity arrays, in accordance with an embodiment of the present invention, is illustrated and designated generally as reference numeral 1300. In FIG. 13, where all 51 similarity arrays have been summed, a strong peak exists within the combinational array, indicating a high likelihood that the object image exists within the query image. Further, because the elements of the combinational array correspond with pixels in the query image, the location in the query image with the highest probability of an instance of the object image is known and can be conveyed to a user. If it were unlikely that an instance of the object image existed within the query image, values in the combinational array would be, relatively low and/or somewhat random, creating a series of hills and valleys with no distinct peak. As can be appreciated with reference to FIGS. 10-13, one similarity array or a few combined similarity arrays may not contain valuable information regarding the existence of an object image within a query image. When many or all of the similarity arrays are combined, however, the combinational array clearly indicates whether there is an instance of an object image within a query image and where the object image exists.

The technique described herein with reference to FIGS. 6-13 provides a number of benefits including, but not limited to matching a logo to a ground image with GPS data. Matching a logo to a ground image with GPS data would allow for more precise satellite imagery applications because, for instance, the satellite imagery application would include information about the exact location of a store or a shop. Additionally, using flexible matching with combinational similarity, a satellite imagery application could align a map with a satellite image, thereby allowing the satellite imagery application to couple the street and road information of the map with the satellite image. For example, many online mapping applications include both a map view and a satellite view. Using flexible matching with combinational similarity a hybrid view may be created, combining the map view and the satellite view. For instance, the hybrid view may include the satellite image, as well as streets, roads, and landmarks from the map superimposed over, and aligned with, the satellite image. Further, by way of example, flexible matching with combinational similarity could be used in an image search by allowing a user to input an image, instead of a text query, into the image search. The image search engine would be able to match the inputted image to images existing in the image search index. In yet another example, flexible matching with combinational similarity could be used in video tracking to track an object, such as the face of a person, through frames of video at multiple locations. These exemplary applications are intended as a way to illustrate the various utilities of flexible matching with combinational similarity and in no way are intended to limit the flexible matching with combinational similarity to the recited applications. Various other applications are contemplated and within the scope of the present invention.

In each of the exemplary methods described herein, various combinations and permutations of the described blocks or steps may be present and additional steps may be added. Further, one or more of the described blocks or steps may be absent from various embodiments. It is contemplated and within the scope of the present invention that the combinations and permutations of the described exemplary methods, as well as any additional or absent steps, may occur. The various methods are herein described for exemplary purposes only and are in no way intended to limit the scope of the present invention.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain the ends and objects set forth above, together with other advantages which are obvious and inherent to the computer-readable media, systems, and methods. It will be understood that certain features and sub-combinations are of utility and may be employed without reference to other features and sub-combinations. This is contemplated by and within the scope of the claims.

The invention claimed is:

1. A computer-implemented method for flexible matching with combinational similarity, comprising:
receiving an object image;
receiving a query image including one or more pixels;
comparing the query image with the object image;
determining one or more matching information based upon combinational similarity, the combinational similarity being a combination of one or more similarity arrays created by comparing one or more gradient histogram information associated with the object image to the one or more gradient histogram information associated with the query image; and
presenting the one or more matching information to a user.

2. The method of claim 1, wherein comparing the query image with the object image using combinational similarity comprises:
dividing the object image into one or more agents;
creating a gradient histogram for the one or more agents;
determining one or more map areas, each map area corresponding to each of the one or more pixels of the query image;
creating a gradient histogram for the one or more map areas; and
creating a similarity array for each of the one or more agents.

3. The method of claim 2, wherein creating a similarity array for each of the one or more agents comprises:
for each agent, comparing the gradient histogram for one of the one or more agents to the gradient histogram for each of the one or more map areas;
wherein the similarity array includes one or more elements, each element associated with a corresponding pixel of the one or more pixels, and
wherein each element of the similarity array represents a similarity between the gradient histogram for the one of the one or more agents and the gradient histogram for the corresponding pixel.

4. The method of claim 2, wherein the gradient histogram for the one or more agents include one or more bin values based upon the properties of the one or more agents.

5. The method of claim 4, wherein the gradient histogram for the one or more map areas include one or more bin values based upon the properties of the one or more map areas.

6. The method of claim 5, wherein the gradient histogram for the one or more agents and the gradient histogram for the one or more map areas include five bin values.

7. The method of claim 1, wherein the object image includes a logo.

8. A computerized system for flexible matching with combinational similarity, the system including one or more processors and comprising:
- a receiving component configured to receive an object image and a query image;
- a dividing component configured to divide the object image into one or more agents;
- a map area component configured to determine one or more map areas, each map area corresponding to a pixel of the query image;
- a histogram component configured to create a gradient histogram for the one or more agents and a gradient histogram for the one or more map areas;
- a comparing component configured to compare the query image with the object image;
- a determining component configured to determine one or more matching information based upon combinational similarity; and
- a database for storing information associated with the object image and the query image.

9. The system of claim 8, wherein the comparing component is further configured to create a similarity array for each of the one or more agents by, for each agent, comparing the gradient histogram for one of the one or more agents to the gradient histogram for each of the one or more map areas.

10. The system of claim 9, further comprising:
- a combinational component configured to combine the similarity array for each of the one or more agents; and
- a peak value component configured to determine whether an instance of the object image exists in the query image.

11. The system of claim 10, further comprising a presentation component configured to present the one or more matching information to a user.

12. The system of claim 11, wherein if the peak value component determines an instance of the object image exists in the query image, the presentation component will present to the user an indication that the object image exists within the query image and the presentation component will further present to the user the location of the object image within the query image.

13. The system of claim 11, wherein if the peak value component determines that no instance of the object image exists in the query image, the presentation component will present to the user an indication that the object image does not exist within the query image.

14. One or more computer storage media, the computer storage media not being a signal per se, having instructions embodied thereon that, when executed, perform a method for flexible matching with combinational similarity, the method comprising:
- receiving one or more object images;
- receiving one or more query images; and
- processing the one or more object images and the one or more query images using combinational similarity,
- wherein processing the one or more object images and the one or more query images using combinational similarity comprises combining one or more similarity arrays created by comparing one or more gradient histogram information associated with the one or more object images to one or more gradient histogram information associated with the one or more query images.

15. The one or more computer storage media of claim 14, wherein processing the one or more object images and the one or more query images using combinational similarity comprises:
- dividing the one or more object images into one or more agents;
- creating a gradient histogram for the one or more agents;
- determining one or more map areas, each map area corresponding to each of one or more pixels of the one or more query images;
- creating a gradient histogram for the one or more map areas; and creating a similarity array for each of the one or more agents.

16. The one or more computer storage media of claim 15, wherein creating a similarity array for each of the one or more agents comprises:
- for each agent, comparing the gradient histogram for one of the one or more agents to the gradient histogram for each of the one or more map areas;
- wherein the similarity array includes one or more elements, each element associated with a corresponding pixel of the one or more pixels, and
- wherein each element of the similarity array represents a similarity between the gradient histogram for the one of the one or more agents and the gradient histogram for the corresponding pixel.

17. The one or more computer storage media of claim 16, wherein processing the one or more object images and the one or more query images using combinational similarity further comprises:
- creating a combinational array by combining the similarity array for each of the one or more agents; and
- determining whether the combinational array includes a peak value indicating an instance of the object image in the query image.

18. The one or more computer storage media of claim 14, wherein the gradient histogram for the one or more agents include one or more bin values based upon the properties of the one or more agents, and wherein the gradient histogram for the one or more map areas include one or more bin values based upon the properties of the one or more map areas.

19. The one or more computer storage media of claim 14,
- wherein the one or more object images include one or more input images submitted to an image search,
- wherein the one or more query images include one or more search images stored in association with a image search index, and
- wherein processing the one or more object images and the one or more query images using combinational similarity further comprises searching for an instance of the one or more input images in the one or more search images.

20. The one or more computer storage media of claim 14,
- wherein the one or more query images include one or more frames of video data, and
- wherein processing the one or more object images and the one or more query images using combinational similarity further comprises tracking the one or more object images through a video stream by identifying the one or more object images in the one or more frames of video data.

* * * * *